Patented May 1, 1923.

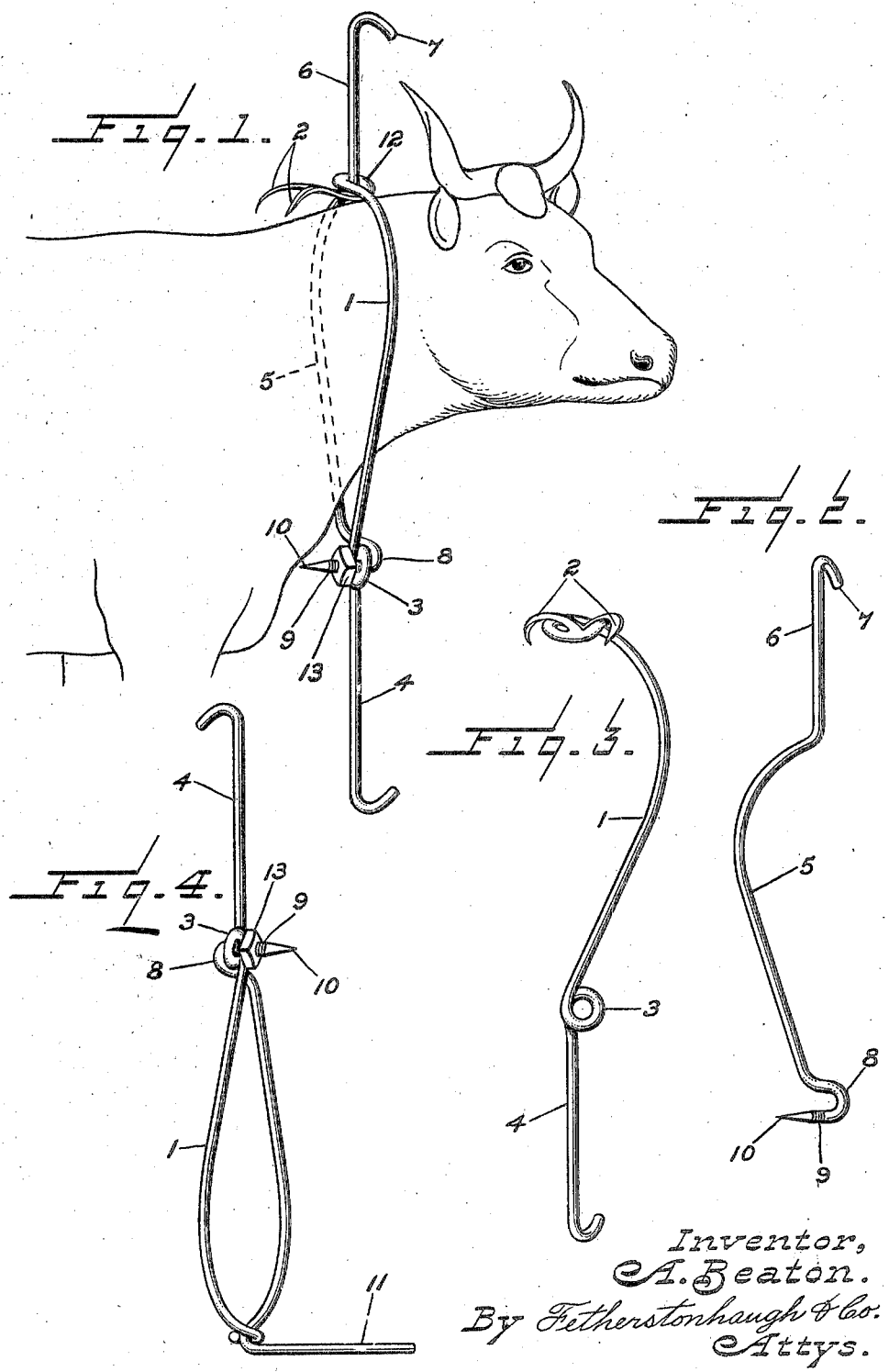

1,453,334

UNITED STATES PATENT OFFICE.

ANGUS BEATON, OF MEDICINE HAT, ALBERTA, CANADA.

ANIMAL POKE.

Application filed October 1, 1921. Serial No. 504,747.

*To all whom it may concern:*

Be it known that I, ANGUS BEATON, a subject of the King of Great Britain, and a resident of the city of Medicine Hat, in the Province of Alberta, Canada, have invented certain new and useful Improvements in Animal Pokes, of which the following is the specification.

My invention relates to improvements in animal pokes and the object of the invention is to construct a device that can be applied to the neck of the animal which will prevent him getting through wire fences and such like obstacles. A further object is to provide means on the device for engaging the lower or upper strands of the fence which will force the upper or lower tines on the device against the neck or brisket of the animal and a still further object is to devise means whereby the poke can be readily put on and removed.

My invention consists of an animal poke constructed and arranged all as hereinafter more particularly described and illustrated in the accompanying drawing in which:

Fig. 1 represents a perspective view of my poke showing the same applied to a cow.

Figures 2 and 3 are enlarged details of the separate portions of the poke, and

Fig. 4 is a perspective view of a modified form of poke particularly applicable to hogs.

Like characters of reference indicate corresponding parts in the different views.

1 is one portion of the poke suitably convexed intermediately and provided with a looped upper end with a rearwardly extending bifurcated tine or pricker 2, the lower part of the portion 1 being provided with a loop 3 and a depending hook 4 having the hook bent in a forward direction. 5 is the other portion of the poke suitably convexed intermediately and provided with an upwardly extending portion 6 with the hooked upper end 7, said hooked upper end being directed forwardly. The lower end of the portion 5 is provided with a hook shaped portion 8, the hook being directed rearwardly and provided with the threaded intermediate portion 9 and a pointed rear end 10.

In the modification shown in Figure 4 the position of the poke on the animal is reversed to that shown in Figure 1. In this case instead of the portion 5 being provided with the hooked end 7 it is provided with a rearwardly extending substantially horizontal portion 11.

In applying my device to the animal the portion 1 is first applied to one side of the neck, then the other portion 5 is applied to the other side of the neck so that the curved or convexed portions lie against the sides of the neck, the hook 7 and upwardly extending portion 6 being inserted through the upper loop 12 in the portion 1 and the pointed end 10 inserted through the lower loop 8 of such portion. A nut 13 is then threaded onto the intermediate portion 9 when the two portions of the poke will be rigidly connected together with the depending hook portion 4 and the hook 7 having the hooks directed in a forward direction.

Now should the animal endeavor to get through a wire fence or other similar obstacle it will be seen that either the hook portion 4 or the upper hook 7 will engage the lower or upper strands of the fence respectively. For instance should the hook 7 engage one of the upper strands of the fence it will tilt the poke rearwardly, thus causing the bifurcated tine 2 to come in contact with the neck of the animal and prick it, causing the animal to jump away from the fence. On the other hand should the hook shaped portion 4 come in contact with the lower strands of the fence it will tilt the poke backwardly, causing the pointed end 10 to come in contact with the breast of the animal and achieve the same result.

In the modification shown in Figure 4 it will be apparent that as it is particularly designed for hogs the lower hook shaped portion is not desirable and accordingly it is replaced by a horizontally extending portion 11 which is designed to extend rearwardly between the animal's fore-legs, thus retaining the poke in the required position.

What I claim as my invention is:

1. In an animal poke, opposedly bent wire members surrounding the animal's neck, one member provided with a loop at one end and a loop formed intermediately of the member, and a forwardly directed hook on the other end thereof, the other member having a portion inserted through the loop in the end of the first mentioned member, a rearwardly directed exteriorly threaded pricker at one end of the second member inserted through the intermediate loop in the first mentioned member, and a nut threaded onto the said pricker.

2. In an animal poke, opposedly bent wire members surrounding the animal's neck, one member provided with a loop at one end and a loop formed intermediately of the member, and a forwardly directed hook on the other end thereof, the other member having a portion inserted through the loop in the end of the first mentioned member and having the end bent rearwardly in a substantially horizontal direction, a rearwardly directed exteriorly threaded pricker at one end of the second member inserted through the intermediate loop in the first mentioned member, and a nut threaded onto the said pricker.

ANGUS BEATON.